(12) United States Patent
Yang

(10) Patent No.: US 11,480,705 B2
(45) Date of Patent: Oct. 25, 2022

(54) ANTENNA, TOOL, AND METHODS FOR DIRECTIONAL ELECTROMAGNETIC WELL LOGGING

(71) Applicant: Oliden Technology, LLC, Sugar Land, TX (US)

(72) Inventor: Jian Yang, Sugar Land, TX (US)

(73) Assignee: Oliden Technology, LLC, Stafford, TX (US)

( * ) Notice: Subject to any disclaimer, the term of this patent is extended or adjusted under 35 U.S.C. 154(b) by 609 days.

(21) Appl. No.: 14/061,566

(22) Filed: Oct. 23, 2013

(65) Prior Publication Data
US 2014/0292340 A1  Oct. 2, 2014

Related U.S. Application Data

(60) Provisional application No. 61/807,236, filed on Apr. 1, 2013.

(51) Int. Cl.
*G01V 3/28* (2006.01)

(52) U.S. Cl.
CPC ..................... *G01V 3/28* (2013.01)

(58) Field of Classification Search
CPC ... G01V 3/30; G01V 3/00; G01V 3/08; G01V 3/18; G01V 3/26; G01V 3/28
USPC ......................................................... 324/338
See application file for complete search history.

(56) References Cited

U.S. PATENT DOCUMENTS

| | | | |
|---|---|---|---|
| 6,297,639 B1* | 10/2001 | Clark et al. .................. 324/338 |
| 6,577,129 B1* | 6/2003 | Thompson et al. .......... 324/338 |
| 6,788,065 B1* | 9/2004 | Homan et al. ................ 324/338 |
| 7,436,183 B2* | 10/2008 | Clark ............................ 324/338 |
| 2008/0074336 A1* | 3/2008 | Signorelli et al. ............ 343/719 |
| 2009/0157367 A1* | 6/2009 | Meyer et al. ................... 703/10 |
| 2010/0225323 A1* | 9/2010 | Tabarovsky et al. ......... 324/341 |
| 2010/0286916 A1* | 11/2010 | Wang ............................... 702/9 |
| 2011/0187373 A1* | 8/2011 | Wisler et al. ................. 324/338 |
| 2011/0316542 A1* | 12/2011 | Frey et al. .................... 324/339 |
| 2012/0249149 A1* | 10/2012 | Bittar et al. .................. 324/337 |
| 2016/0091628 A1* | 3/2016 | Reagor .................... G01V 3/28 324/339 |
| 2016/0139231 A1* | 5/2016 | Homan .................... G01V 3/28 324/376 |

OTHER PUBLICATIONS

Written Opinion of the ISA, dated Aug. 1, 2014.*
Definition of "Associated With," Oxford Dictionaries Web Page, Mar. 2016.*
Definition of "Associated With," Learners Dictionary Web Page, May 2016.*

* cited by examiner

*Primary Examiner* — David M Schindler
(74) *Attorney, Agent, or Firm* — Bryan L. White

(57) ABSTRACT

The present disclosure describes various antenna assemblies, each antenna coil being disposed about a tool body section in an antenna pathway. The antenna pathway passes through alternating grooves and lands. In each embodiment, at least one of the grooves is disposed in the tool body section at a non-axial direction relative to the longitudinal axis of the tool body section. In an embodiment, the antenna coil is an axial coil or a tilted coil. Additional grooves oriented at axial direction may be disposed on the tool body section. Each of the antenna assemblies disclosed may be employed in an electromagnetic logging tool for providing directional measurements while drilling.

31 Claims, 9 Drawing Sheets

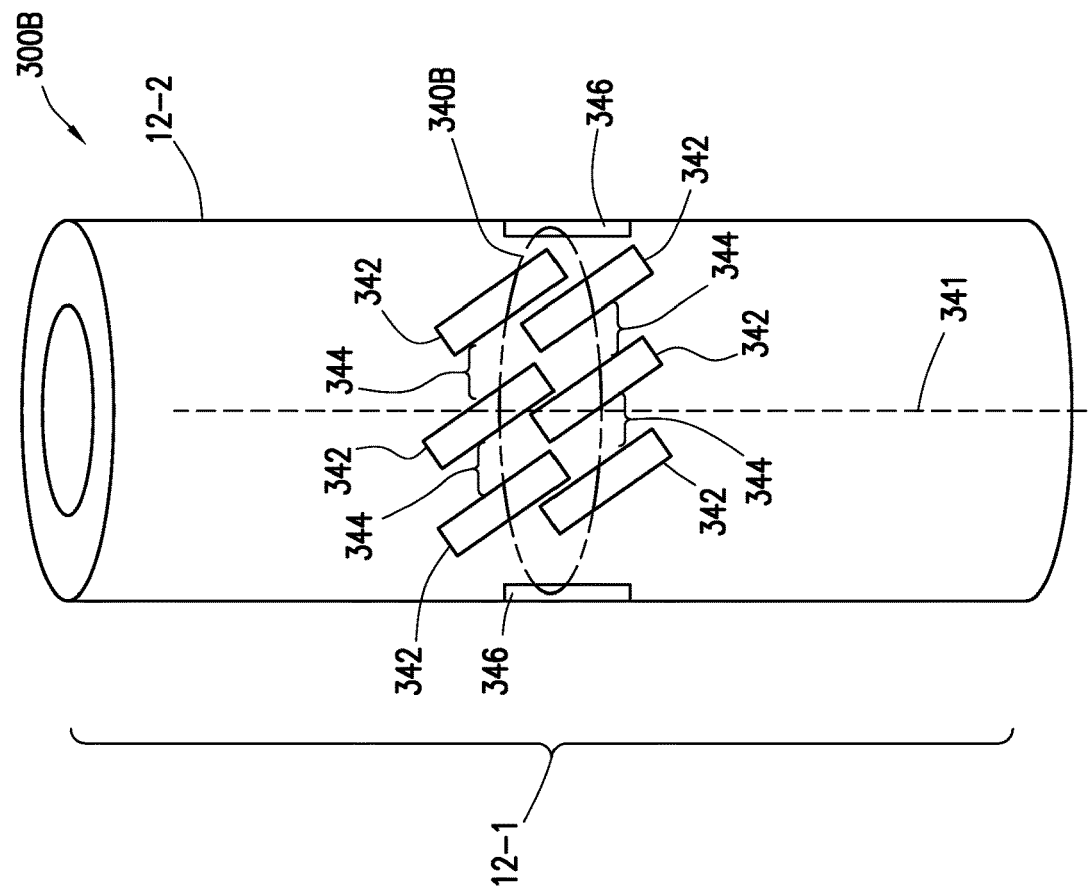
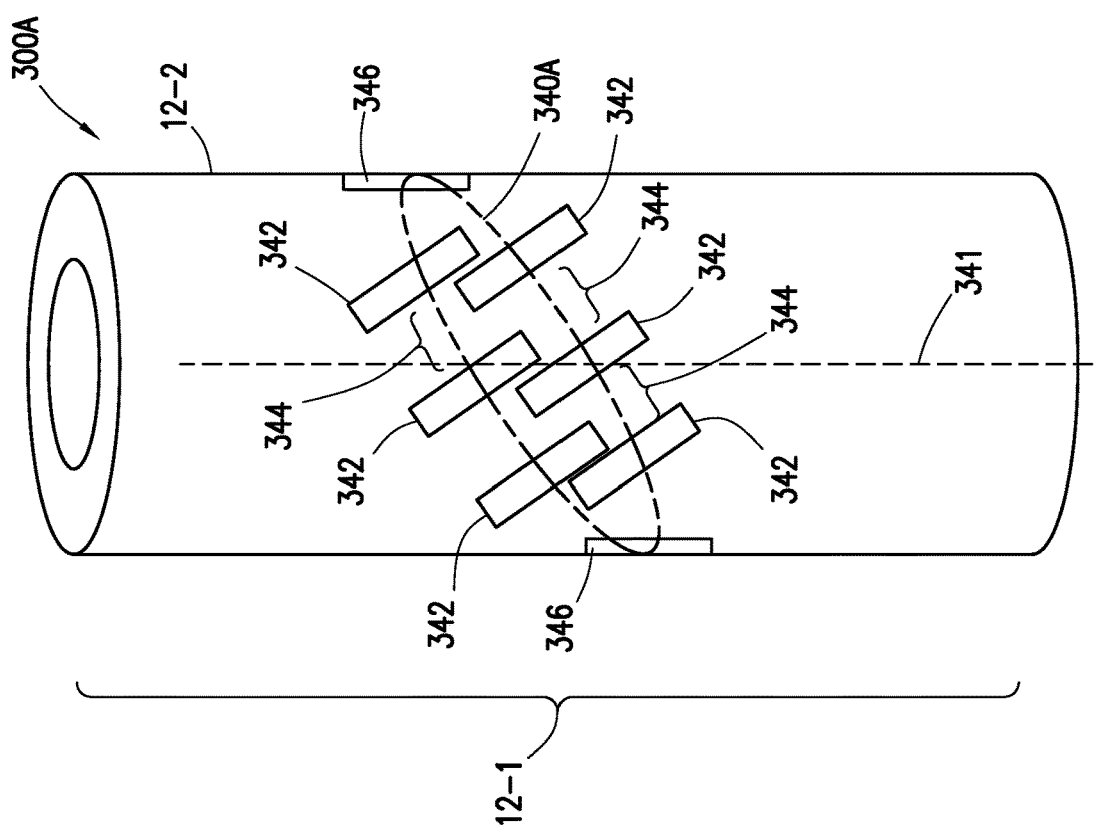

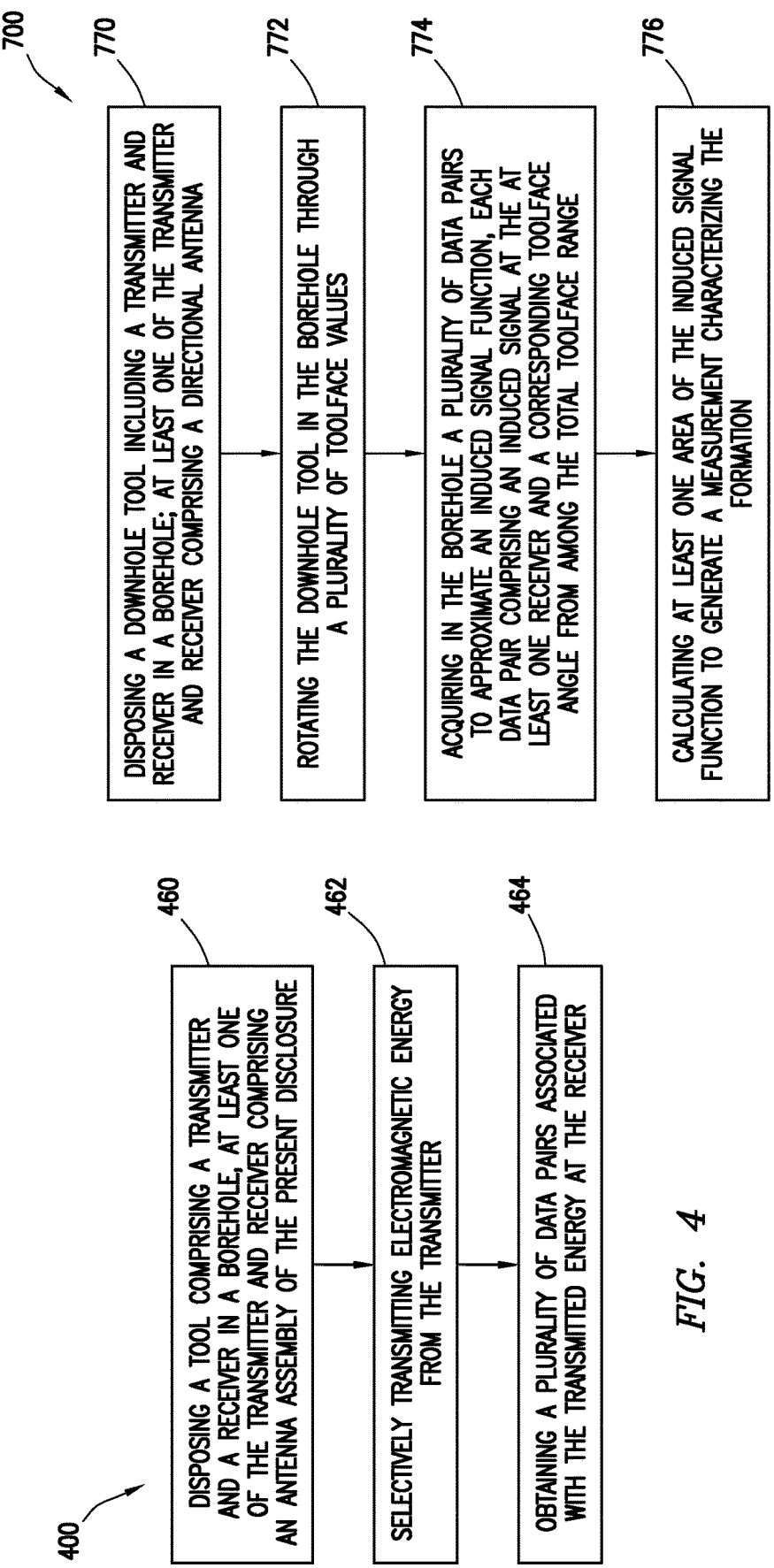

ANTENNA, TOOL, AND METHODS FOR DIRECTIONAL ELECTROMAGNETIC WELL LOGGING

CROSS-REFERENCE TO RELATED APPLICATION

This application claims the benefit of U.S. Provisional Application No. 61/807,236, filed Apr. 1, 2013.

BACKGROUND

The present disclosure relates generally to the field of logging tools and particularly to electromagnetic logging tools. More specifically, the present disclosure relates to various directional antenna and tool designs, and methods for directional electromagnetic well logging while drilling.

Various well logging techniques are known in the field of hydrocarbon exploration and production. These techniques use instruments or tools equipped with transmitters adapted to emit energy into a subsurface formation that has been penetrated by a borehole. In this description, "instrument" and "tool" will be used interchangeably to indicate, for example, an electromagnetic instrument (or tool), a wire-line tool (or instrument), or a logging-while-drilling tool (or instrument). The emitted energy interacts with the surrounding formation to produce signals that are then detected and measured by one or more sensors. By processing the detected signal data, a profile of formation properties can be generated.

More specifically, electromagnetic logging tools including electromagnetic induction and wave propagation logging tools are used for determination of electrical properties of formations surrounding a borehole. Such logging tools obtain measurements relating to resistivity (or its inverse, conductivity) of the formation that, when interpreted, illustrate various petrophysical properties of the formation and fluids therein. The physical principles of electromagnetic induction resistivity well logging are well known.

Electromagnetic logging tools use transmitter and receiver antennas formed from an antenna coil, or a coil for short, formed of one or more turns of conductor wire, wound around a support. In some embodiments, such antennas may be operable as transmitter and/or receiver. Those skilled in the art will appreciate that an antenna may be used as a transmitter at one time and as a receiver at another. It will also be appreciated that the transmitter-receiver configurations disclosed herein are interchangeable due to the principle of reciprocity, i.e., the "transmitter" may be used as a "receiver", and vice-versa.

Conventional electromagnetic logging tools employ non-directional transmitter and receiver antennas that do not have azimuthal sensitivity. In high angle or horizontal wells, measurements obtained with non-directional, antennas do not contain information about the directionality of the formation that allows distinguishing whether the borehole is approaching, e.g., a conductive layer from above or below. Such information is used in well placement applications. The logging tools comprising a directional antenna (an antenna having azimuthal sensitivity) such as those described in U.S. Pat. Nos. 5,508,616, 6,163,155, 6,476,609. Such logging tools can provide a directional measurement containing information about the directionality of the formation. It further provides more information used for various formation evaluation applications.

One challenge of logging-while-drilling electromagnetic logging tools is to protect the antenna coil in order to withstand the demanding harsh downhole conditions. One design to protect the antenna known in prior art is to provide a portion of the collar as "necked-down", by radially reducing the collar dimension to provide a deep and wide groove. The antenna coil is wound about the reduced radial dimension area of the collar, separated by an insulating layer from the surface of the reduced area, and a slotted sleeve or shield is provided and secured in position over the antenna coil. Various antenna designs of this type are described in U.S. Pat. Nos. 4,536,714, 4,949,045, 6,297,639, and 6,566,881.

Another design known in the prior art is to provide the antenna coil directly in a pathway within a drill collar having grooves through the thickness of drill collar, without the slotted shield disposed about the antenna coil found in the first method described. The antenna coil in the pathway exposed in the grooves is protected by a non-metallic material disposed in the grooves, and the antenna coil in the pathway between grooves is protected by the material of the drill collar through which the pathway passes. Various antenna designs of this type are described in U.S. Pat. Nos. 5,138,263, 5,530,358, 6,577,129, 7,057,392, 7,414,407, and 7,839,149.

Various processing methods for generating measurements from data collected by logging-while-drilling electromagnetic logging tools including a directional antenna are described in U.S. Pat. Nos. 7,382,135 and 8,195,400.

SUMMARY

In at least one aspect, the disclosure relates to an antenna assembly. The antenna assembly includes a tool body section with a longitudinal axis, the tool body section having an external surface. In the external surface, a plurality of grooves of reduced radial dimension are spaced around the tool body section. At least one of the plurality of grooves being oriented at a non-axial direction with respect to the longitudinal axis of the tool body section. In the external surface, a plurality of lands of radial dimension similar or substantially flush to the external surface of the tool body section are provided, each land of the plurality of lands separating at least two adjacent grooves of the plurality of grooves. The antenna assembly also includes an antenna pathway traversing the plurality of grooves and plurality of lands around the tool body section. The antenna assembly also includes a coil disposed in the antenna pathway.

In at least one aspect, the disclosure relates to a method of obtaining a measurement in a borehole formed in a formation. The method includes disposing a tool comprising a transmitter and a receiver in a borehole, at least one of the transmitter and receiver comprising an antenna assembly. The antenna assembly includes a tool body section with a longitudinal axis, the tool body section having an external surface. In the external surface, a plurality of grooves of reduced radial dimension are spaced around the tool body section. At least one of the plurality of grooves being oriented at a non-axial direction with respect to the longitudinal axis of the tool body section. In the external surface, a plurality of lands of radial dimension similar or substantially flush to the external surface of the tool body section are provided, each land of the plurality of lands separating at least two adjacent grooves of the plurality of grooves. The antenna assembly also includes an antenna pathway traversing the plurality of grooves and plurality of lands around the tool body section. The antenna assembly also includes a coil disposed in the antenna pathway. The method also includes selectively transmitting electromagnetic energy from the transmitter. The method also includes obtaining a plurality of data pairs associated with the transmitted energy at the receiver.

In at least one aspect, the disclosure relates to a downhole measurement tool for obtaining data in a borehole. The downhole measurement tool includes at least one transmitter deployed about a first tool body section and at least one receiver deployed about a second tool body section, the receiver being axially spaced from the transmitter. At least one of the transmitter and receiver is the antenna assembly described above. The antenna assembly includes a tool body section with a longitudinal axis, the tool body section having an external surface. In the external surface, a plurality of grooves of reduced radial dimension are spaced around the tool body section. At least one of the plurality of grooves being oriented at a non-axial direction with respect to the longitudinal axis of the tool body section. In the external surface, a plurality of lands of radial dimension similar or substantially flush to the external surface of the tool body section are provided, each land of the plurality of lands separating at least two adjacent grooves of the plurality of grooves. The antenna assembly also includes an antenna pathway traversing the plurality of grooves and plurality of lands around the tool body section. The antenna assembly also includes a coil disposed in the antenna pathway.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of antennas, tools, and methods for directional electromagnetic well logging are described with reference to the following figures. Like numbers are used throughout the figures to reference like features and components.

FIG. 3A-3E provide side views of various antenna assemblies in accordance with embodiments of the present disclosure.

FIG. 4 shows a flow chart of a method for acquiring data using an antenna assembly in accordance with the present disclosure.

FIG. 7 shows a flow chart of a method for processing data obtained in accordance with the present disclosure to generate measurements.

DEFINITIONS

Figure 1:
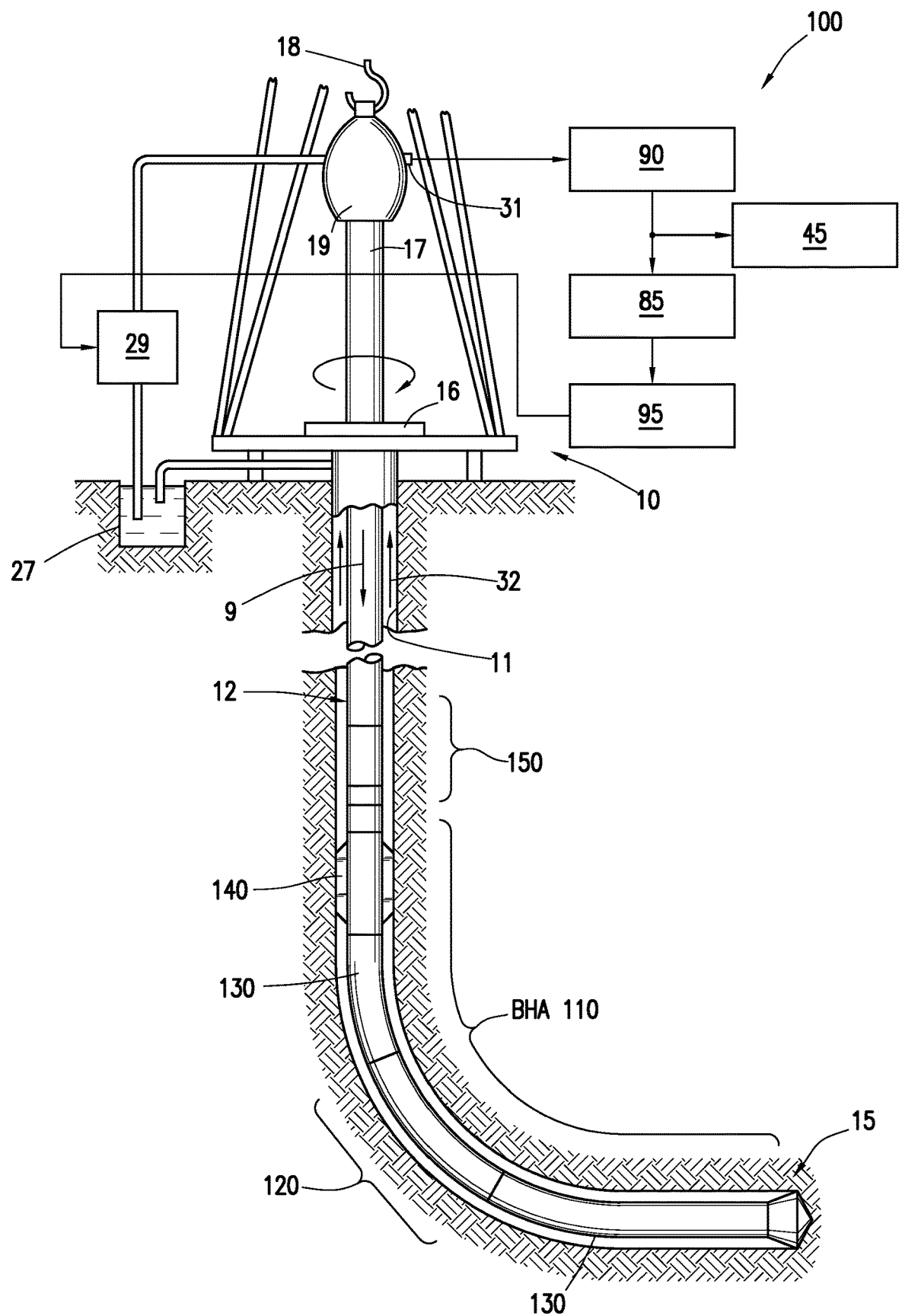
FIG. 1 is schematic of a drilling environment that may be used in connection with various implementations of the present disclosure.

As used here, the terms "up" and "down"; "upper" and "lower"; "upwardly" and "downwardly"; "below" and "above"; and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate, where "up" is the position in a toolstring relatively more proximal to surface equipment, and "down" is the position in the toolstring relatively more proximal to the bottom hole assembly.

"Axial" refers to a direction running substantially parallel to the longitudinal axis of a downhole tool or housing.

"Non-axial" refers to a direction running at some angle not parallel to the longitudinal axis of a downhole tool or housing, including angles orthogonal as well as some angle less than ninety degrees.

"Induced Signal Function" refers to a signal induced at a receiver of the tool by the electromagnetic wave emitted at a transmitter of the tool, as a function of the toolface angle. In an embodiment of the present disclosure, the induced signal is measured at a discrete time, and the induced signal function is therefore approximately defined by a plurality of data pairs, each pair comprising an induced signal, and a corresponding toolface angle.

"Toolface angle" refers to the angular separation about the circumference of the tool from a given direction to the radial direction of a reference point on a downhole tool.

"Total toolface range" refers to the 360 degree range that covers a full or complete azimuthal rotation.

"Tool body section" refers to a portion of any tubular mechanical support that is adapted to be moveable through a borehole, the portion being substantially local to the position of the antenna coil disposed thereon, such as, for example, a portion of any of a drill collar, segment of drill pipe, tool housing, or other wellbore tubular, having an external surface and internal surface separated by a wall thickness, and the internal surface defining a central bore therethrough. The overall length of a tool may exceed the tool body section local to the coil.

"Antenna pathway" refers to, in one or more grooves, at least the space occupied by an antenna coil; and in one or more lands, the antenna pathway refers to at least a space through which an antenna coil may pass.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The present disclosure describes various embodiments for antenna assemblies, each antenna coil being disposed about a tool body section in an antenna pathway. The antenna pathway passes through alternating lands (having a similar or substantially flush outer diameter as the tool body section) and grooves (having a reduced outer diameter relative to the tool body section, not passing completely through the thickness of the tool body section). In each embodiment, at least one of the grooves are disposed in the tool body section at a non-axial direction relative to the longitudinal axis of the tool body section, that is, not parallel to the longitudinal axis of the tool body section. In an embodiment, the antenna coil is an axial coil, where the axis of the coil is parallel to the axis of the tool body section, or a tilted coil, where the axis of the coil is not parallel to the axis of the tool body section. Additional grooves at axial angles or transverse angles may be disposed on the tool body section. Magnetic permeable material, such as ferrite, inserts may be disposed in the grooves. Each of the antenna assemblies disclosed may be employed in an electromagnetic logging tool for providing directional measurements while drilling.

The present disclosure also describes methods of acquiring a plurality of data pairs, each data pair comprising an induced signal at a receiver and a corresponding toolface angle using a tool including at least one directional antenna, such as a directional antenna assembly as described herein. It further discloses a method to generate a measurement containing information about the directionality of the formation by calculating at least one area of an induced signal function approximated by the plurality of data pairs.

Hardware

FIG. 1 illustrates a drilling environment 100 that may be used in connection with various implementations of the present disclosures. In one implementation, the drilling environment 100 may include a drilling rig 10 positioned over a wellbore 11. A drilling tool assembly, which may include a drill string 12 and a drill bit 15 coupled to the lower end of drill string 12, may be disposed in wellbore 11. Drill string 12 and bit 15 may be rotated by a kelly 17 coupled to the upper end of drill string 12. The kelly 17 may be rotated by engagement with a rotary table 16 disposed on the rig 10. The kelly 17 and the drill string 12 may be suspended by a hook 18 coupled to the kelly 17 by a rotatable swivel 19.

Drilling fluid may be stored in a pit 27 and may be pumped through the center of drill string 12 by a mud pump 29 to flow downwardly (shown by arrow 9). After circulation through bit 15, the drilling fluid may circulate upwardly (indicated by arrow 32) through an annular space between wellbore 11 and drill string 12. Flow of the drilling mud may lubricate and cool bit 15 and lift drill cuttings made by bit 15 to the surface for collection and disposal.

A bottom hole assembly (BHA) 110 may be connected to drill string 12. The bottom hole assembly 110 may include a stabilizer 140 and a drill collar 130, which may be coupled to a local measuring device 120. The bottom hole assembly 110 may also include a downhole communications system 150, such as a pressure modulation (mud pulse) telemetry system. Pressure modulation telemetry can include various techniques for selectively modulating the flow (and consequently the pressure) of the drilling mud. The drill string 12 can also (or alternatively) comprise wired drill pipes that support high-speed telemetry between the surface and downhole tools.

A transducer 31 disposed at the earth's surface may be configured to detect pressure variations and to conduct signals to an uplink telemetry subsystem 90 for demodulation and interpretation. The demodulated signals may be forwarded to a processor 85 and a recorder 45 for further processing and/or storage. The surface equipment may optionally include a downlink telemetry subsystem 95, which may include a pressure modulation transmitter (not detailed) that can modulate the pressure of the drilling mud circulating downwardly to communicate control signals to the bottom hole assembly 110. It should be understood that the mud telemetry described above is one example of a communication means. Other telemetry systems known in the art may also be used.

The downhole communications system 150 may also include various types of processors and controllers (not shown) for controlling the operation of sensors disposed therein, for communicating command signals to the local measuring device 120, and for receiving and processing measurements transmitted from the local measuring device 120. Sensors in bottom hole assembly 110 and/or downhole communications system 150 may include magnetometers, accelerometers, gyrometers, and the like.

Various instruments disposed in the bottom hole assembly 110, the downhole communications system 150, and the local measuring device 120 may be referred to collectively as a logging-while-drilling (LWD) tool or measurement-while-drilling (MWD) tool. The bottom hole assembly 110, the processor 85, and/or the downhole communications system 150 may include various forms of data storage or memory that can store measurements made by any or all of the sensors, including sensors disposed in the local measuring device 120, for later processing during or after the drill string 12 is withdrawn from wellbore 11. In one implementation, the LWD or MWD tool may be a propagation resistivity tool. As such, the bottom hole assembly 110, the downhole communications system 150, and the local measuring device 120 may be used to obtain well log data obtained from various transmitter-receiver pairs (to be discussed further below) and at multiple frequencies. Such data may be communicated to the surface while the LWD or MWD tool is downhole or stored in the LWD or MWD tool for later readout.

Figure 2:
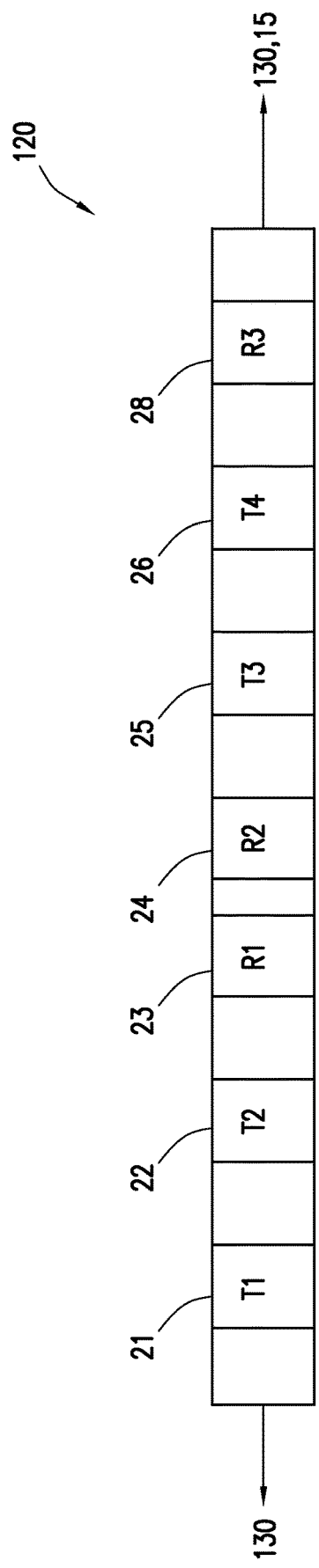
FIG. 2 is a schematic drawing of an example electromagnetic logging tool in accordance with an embodiment of the present disclosure.

FIG. 2 is a block diagram of an example downhole tool for use as the local measuring device 120 of FIG. 1 in accordance with an embodiment of the present disclosure. Starting at left of FIG. 2, various antenna assemblies (one or more of which may be in accordance with antenna assemblies described herein) are provided along the local measuring device 120 shown. Each antenna assembly may function as a transmitter or receiver. At left, the local measuring device 120 is connected to the drill collar 130 as shown in FIG. 1. A first antenna assembly T1 21 functions as a first transmitter. Adjacent to T1 21 is positioned a second antenna assembly T2 22, functioning as a second transmitter. Axially spaced apart from T2 22 are positioned one or more antenna assemblies. As shown, a third antenna assembly R1 23 is positioned and is functional as a receiver, with a fourth antenna assembly R2 24 functional as a receiver, coupled to a fifth antenna assembly T3 25 functional as a transmitter. Axially spaced apart from T3 are positioned a sixth antenna assembly T4 26 functional as a transmitter and a seventh antenna assembly R3 28 functional as a receiver. At the right, the local measuring device 120 is connected to a next proximate section of drill collar 130 and on to the drill bit 15.

As is well known, antenna assemblies in general may function as receiver, transmitter, or both, being referred to as a transceiver, and thus the example presented here is intended only as a representative example, and various other combinations of receivers, transmitters, and/or transceivers are presently contemplated. For example, the logging tool may be implemented with multiple modules, with one or more transmitter antenna assemblies deployed on one module, transmitting electromagnetic energy to be received by one or more receiver antenna assemblies deployed on a different module. The modules of the tool are removably joined to one another, or to an intervening module or set of modules, which may be other tools in the tool string. At least one of the transmitter and receiver antenna assemblies is in accordance with antenna assemblies described herein. Additional transmitters and/or receivers (not shown) may be provided adjacent to the antenna assemblies shown FIG. 2 as well.

In a particular embodiment of the downhole tool of FIG. 2, T1 21 comprises a non-directional antenna, while T2 22 comprises a directional antenna, such as one of the antenna assembly embodiments presented here. In an embodiment, R1 23 comprises a non-directional antenna, R2 24 comprises a non-directional antenna, and T3 25 comprises a directional antenna, such as one of the antenna assembly embodiments presented here. In an embodiment, T4 26 comprises a non-directional antenna, and R3 28 comprises a directional antenna, such as one of the antenna assembly embodiments presented here. Optionally, additional transmitters and/or receivers may also be disposed in the local measuring device 120, in various positions, and used in combination with the transmitters and receivers shown.

In a particular embodiment of the local measuring device 120 of FIG. 2, the spacing between adjacent antenna assemblies may range from about six (6) inches to about eighteen (18) inches. In a particular embodiment of FIG. 2, the spacing between some adjacent antenna assemblies (21 and 22, 22 and 23, 24 and 25, 25 and 26, and 26 and 28) may be sixteen (16) inches, while the spacing between some adjacent antenna assemblies 23 and 24 (such as those used as receivers) may be about eight (8) to ten (10) inches. In other embodiments, the spacing between adjacent antenna assemblies may span larger or smaller distances.

Figure 3D:
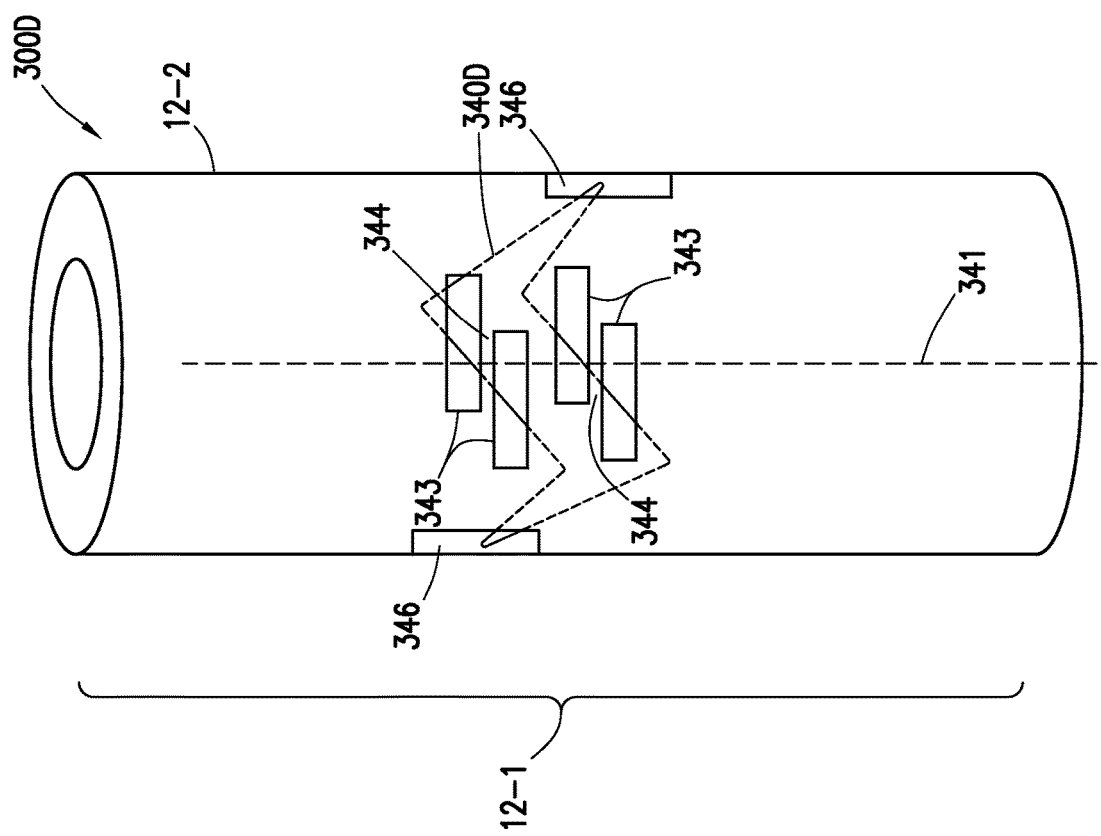

FIG. 3A-3E provide side views of various directional antenna assemblies in accordance with embodiments of the present disclosure. In each of the embodiments of the antenna assembly, a tool body section 12-1 is provided, defined having a longitudinal axis 341 running length-wise. Turning to FIG. 3A, the tool body section 12-1 has an external surface 12-2, into which are disposed a plurality of grooves such as 342. Each of the grooves 342 has a reduced radial dimension relative to the external surface 12-2 of the tool body section 12-1. The grooves 342 are spaced around the tool body section 12-1. Between neighboring grooves 342, a land 344 is disposed, each land 344 having a radial dimension larger than that of each of the neighboring grooves and similar or substantially flush to that of the external surface 12-2 of the tool body section 12-1. In each embodiment described below, at least one of the grooves 342 is oriented at a non-axial direction with respect to the longitudinal axis 341 of the tool body section 12-1. An antenna pathway 347 (shown by dashed line in FIG. 3E) traverses the plurality of grooves 342 and plurality of lands 344 around the tool body section 12-1. The antenna pathway 347 passes through the lands 344, and a portion (or portions) of the space in each of the grooves that allows passage of a coil 340, which may comprise one or multiple turns, and may be non-planar.

FIG. 3A shows an embodiment of a first antenna assembly 300A, intended to show relative positioning of the grooves and coil. A tool body section 12-1 has an external surface 12-2, and having a longitudinal axis 341. Specifically, six grooves 342 and two grooves 346 are disposed in the external surface 12-2, shown here as rectangular, but may be of any geometrical shape such as quadrilateral or otherwise elongated in shape. Each groove 342, 346 is defined by two sides, a top and a bottom, which may be optionally rounded off. Each groove 342, 346 also has a depth, which may be a portion of the thickness of the tool body section 12-1. The depth may be, for example, uniform, graduated, or rounded. The orientation of each groove 342, 346 refers to the direction in which the groove 342, 346 is elongated. In the most simplified terms, each groove 342, 346 acts as a magnetic dipole oriented the same orientation as the elongation of the groove 342, 346, respectively.

As shown, the six grooves 342 are oriented at a non-axial direction relative to the longitudinal axis 341, while two grooves 346 are oriented in the axial direction relative to the longitudinal axis 341. A tilted coil 340A is positioned in an antenna pathway, passing through the alternating grooves 342 and grooves 346, where the coil is shown in solid curve, and lands 344, where the coil is shown in dashed curve. The antenna pathway can be formed by machining out a portion of each land 344, and subsequently welding each land 344 to the tool body section 12-1 before or after the coil(s) 340A are wound. The antenna pathway can also be formed by machining out a portion of each land 344, and subsequently covering the antenna coil with a cover part, preferably having similar electromagnetic properties to the material of the tool body section 12-1, over the coil for each land 344 after the coil 340A is wound. The addition of the cover part restores the overall radial dimension of the land. In one embodiment, the antenna pathway can also be formed by machining out a portion of each land 344, and subsequently filling each machined-out-portion with a non-metallic protective material, such as fiber glass or epoxy, to restore the overall dimension of the land after the coil 340A is wound. Alternatively, the antenna pathway may be drilled or punched through each land. In an embodiment, the antenna pathway in the lands 344 is preferably minimized to allow the antenna coil to pass therethrough without additional void space remaining around the antenna coil, and optionally, if void space is present, the void space may be sealed with a non-metallic filler, such as fiberglass or epoxy. In an embodiment, the non-axially oriented grooves 342 are oriented substantially perpendicular to the coil 340A.

In one embodiment, a non-metallic protective material, such as fiber glass or epoxy, is disposed in each groove when the coil 340A is in place, substantially filling the remaining space of the groove to a level flush with the external surface of each neighboring land 344.

In one embodiment, a magnetic permeable material insert (not shown in FIG. 3A) may be optionally disposed in each groove such that the insert is under the coil 340A when the coil 340A is placed about the tool body section 12-1. The magnetic permeable material may, for example, be a ferrite material.

In one embodiment, the two axial grooves 346 can be removed from FIG. 3A. On the other hand, the removal of non-axial grooves 342 or replacement of non-axial grooves 342 with axial grooves from FIG. 3A will result in a non-directional antenna assembly.

FIG. 3B shows an embodiment of a second antenna assembly 300B, intended to show relative positioning of the grooves and coil. A cylindrical tool body section 12-1 has an external surface 12-2, and has a longitudinal axis 341. Six grooves 342 and two grooves 346 are disposed in the external surface 12-2, shown here as rectangular, but may be of any geometrical shape such as quadrilateral or otherwise elongated in shape. Each groove 342, 346 is defined by two sides, a top and a bottom, which may be optionally rounded off. Each groove 342 also has a depth, which may be a portion of the thickness of the tool body section 12-1. The depth may be, for example, uniform, graduated, or rounded. The orientation of each groove 342, 346 refers to the direction in which the groove 342, 346 is elongated. In the most simplified terms, each groove 342, 346 acts as a magnetic dipole oriented the same orientation as the groove 342, 346. As shown, grooves 342 are oriented at a non-axial direction relative to the longitudinal axis 341, while two grooves 346 are oriented in the axial direction relative to the longitudinal axis 341. An axial coil 340B is positioned in an antenna pathway (not shown), passing through the alternating grooves 342, where the coil 340B is shown in solid curve, and lands 344, where the coil is shown in dashed curve. The non-axially oriented grooves 342 are oriented at an angle to the coil 340B.

As above, the antenna pathway can be formed by machining out a portion of each land 344, and subsequently welding each land 344 to the tool body section 12-1 before or after the coil(s) 340B are wound. The antenna pathway can also be formed by machining out a portion of each land 344, and subsequently covering the antenna coil with a cover part, preferably having similar electromagnetic properties to the material of the tool body section 12-1 over the coil for each land 344 after the coil 340B is wound. The addition of the cover part restores the overall radial dimension of the land. In one embodiment, the antenna pathway can also be formed by machining out a portion of each land, and subsequently filling each machined-out-portion with a non-metallic protective material, such as fiber glass or epoxy, to restore the overall radial dimension of the land after the coil 340B is wound. Alternatively, the antenna pathway may be drilled or punched through each land. In an embodiment, the antenna pathway in the lands 344 is preferably minimized to allow the antenna coil to pass therethrough without additional void space remaining around the antenna coil, and optionally, if void space is present, the void space may be sealed with a non-metallic filler, such as fiberglass or epoxy.

In one embodiment, a non-metallic protective material, such as fiber glass or epoxy, is disposed in each groove when the coil 340B is in place, substantially filling the remaining space of the groove to a level flush with the external surface of each neighboring land 344. In one embodiment, a magnetic permeable material insert may be disposed in each groove such that the insert is under the coil 340B when the coil 340B is placed about the tool body section 12-1. The magnetic permeable material may, for example, be a ferrite material.

In one embodiment, the two axial grooves 346 can optionally be removed in FIG. 3B. On the other hand, the removal of non-axial grooves 342 or replacement of non-axial grooves 342 with axial grooves from FIG. 3B will result in a non-directional antenna assembly.

Figure 3C:
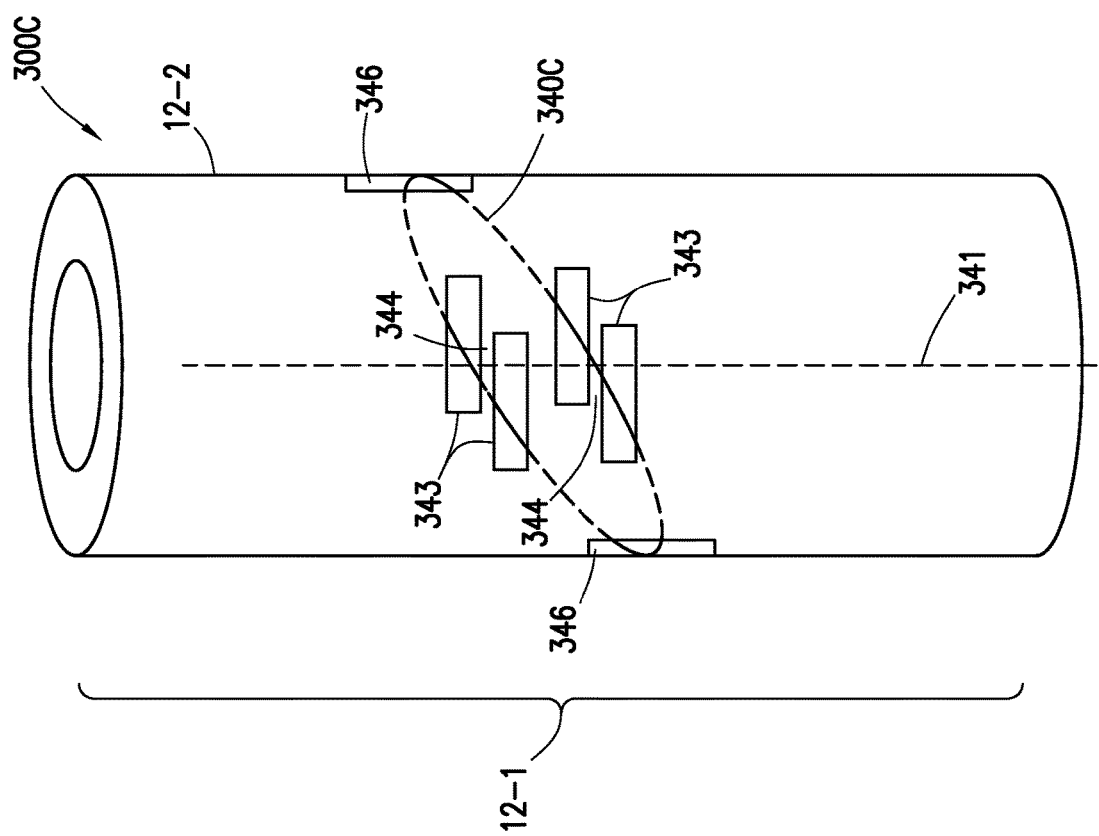

FIG. 3C shows an embodiment of a third antenna assembly 300C, intended to show relative positioning of the grooves and coil. A cylindrical tool body section 12-1 has an external surface 12-2, and has a longitudinal axis 341. Six grooves are disposed in the external surface 12-2, shown here as rectangular, but may be of any geometrical shape such as quadrilateral or otherwise elongated in shape. Each groove 343, 346 is defined by two sides, a top and a bottom, which may be optionally rounded off. Each groove 343, 346 also has a depth, which may be a portion of the thickness of the tool body section 12-1. The depth may be, for example, uniform, graduated, or rounded. The orientation of each groove 343, 346 refers to the direction in which the groove 343, 346 is elongated. In the most simplified terms, each groove 343, 346 acts as a magnetic dipole oriented the same orientation as the groove 343, 346. As shown, four of the grooves 343 are oriented orthogonally relative to the longitudinal axis 341. Two of the grooves 346 are oriented axially relative to the longitudinal axis 341. A tilted coil 340C is positioned in an antenna pathway, passing through the alternating grooves 342, where the coil is shown in solid curve, and lands 344, where the coil is shown in dashed curve.

As above, the antenna pathway can be formed by machining out a portion of each land 344, and subsequently welding each land 344 to the tool body section 12-1 before or after the coil(s) 340C are wound. The antenna pathway can also be formed by machining out a portion of each land 344, and subsequently covering the antenna coil with a cover part, preferably having similar electromagnetic properties to the material of the tool body section 12-1 over the coil for each land 344 after the coil 340C is wound. The addition of the cover part restores the overall radial dimension of the land. In one embodiment, the antenna pathway can also be formed by machining out a portion of each land 344, and subsequently filling each machined-out-portion with a non-metallic protective material, such as fiber glass or epoxy, to restore the overall radial dimension of the land after the coil 340C is wound. Alternatively, the antenna pathway may be drilled or punched through each land. In an embodiment, the antenna pathway in the lands 344 is preferably minimized to allow the antenna coil to pass therethrough without additional void space remaining around the antenna coil, and optionally, if void space is present, the void space may be sealed with a non-metallic filler, such as fiberglass or epoxy.

In one embodiment, a non-metallic protective material, such as fiber glass or epoxy, is disposed in each groove when the coil 340C is in place, substantially filling the remaining space of the groove to a level flush with the external surface of each neighboring land 344. In one embodiment, a magnetic permeable material insert may be disposed in each groove such that the insert is under the coil 340C when the coil 340C is placed about the tool body section 12-1. The magnetic permeable material may, for example, be a ferrite material.

In one embodiment, the two axial grooves 346 can be removed from FIG. 3C.

FIG. 3D shows an embodiment of a fourth antenna assembly 300D, intended to show relative positioning of the grooves and coil. A cylindrical tool body section 12-1 has an external surface 12-2, and has a longitudinal axis 341. Six grooves are disposed in the external surface 12-2, shown here as rectangular, but may be of any geometrical shape such as quadrilateral or otherwise elongated in shape. Each groove 343, 346 is defined by two sides, a top and a bottom, which may be optionally rounded off. Each groove 343, 346 also has a depth, which may be a portion of the thickness of the tool body section 12-1. The depth may be, for example, uniform, graduated, or rounded. The orientation of each groove 342, 346 refers to the direction in which the groove 342, 346 is elongated. In the most simplified terms, each groove 343, 346 acts as a magnetic dipole oriented the same orientation as the groove 343, 346.

As shown, four of the grooves 343 are oriented orthogonally relative to the longitudinal axis 341. Two of the grooves 346 are oriented axially relative to the longitudinal axis 341. A segmented coil 340D is positioned in an antenna pathway, passing through the alternating grooves 343 and 346. The antenna pathway can be formed by machining out a part from each land 344, and (optionally) by subsequently welding each land 344 to the tool body section 12-1 before or after the coil(s) 340A are wound, or other means.

As above, the antenna pathway can also be formed by machining out a portion of each land 344, and subsequently covering the antenna coil with a cover part, preferably having similar electromagnetic properties to the material of the tool body section 12-1 over the coil for each land 344 after the coil 340D is wound. The addition of the cover part restores the overall radial dimension of the land. In one embodiment, the antenna pathway can also be formed by machining out a portion of each land 344, and subsequently filling each machined-out-portion with a non-metallic protective material, such as fiber glass or epoxy, to restore the overall radial dimension of the land after the coil 340D is wound. Alternatively, the antenna pathway may be drilled or punched through each land. In an embodiment, the antenna pathway in the lands 344 is preferably minimized to allow the antenna coil to pass therethrough without additional void space remaining around the antenna coil, and optionally, if void space is present, the void space may be sealed with a non-metallic filler, such as fiberglass or epoxy.

In one embodiment, a non-metallic protective material, such as fiber glass or epoxy, is disposed in each groove when the coil 340D is in place, substantially filling the remaining space of the groove to a level flush with the external surface of each neighboring land 344. In one embodiment, a magnetic permeable material insert may be disposed in each groove such that the insert is under the coil 340D when the coil 340D is placed about the tool body section 12-1. The permeable material may, for example, be a ferrite material.

In one embodiment, the two axial grooves 346 can be removed from FIG. 3D.

Figure 3E:
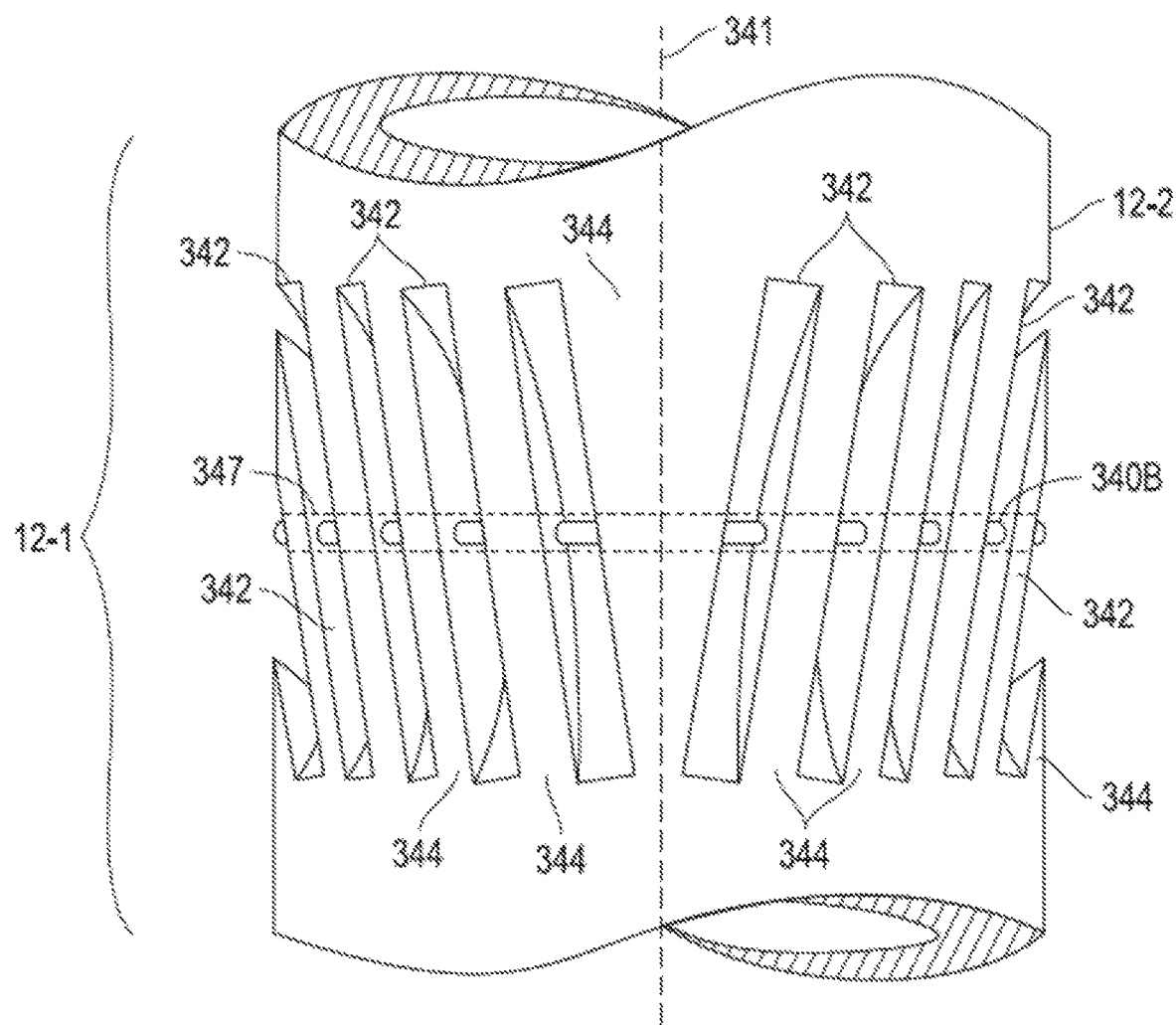

FIG. 3E shows a side view of an antenna assembly in accordance with the embodiment shown in FIG. 3B. The external surface 12-2 of the tool body section 12-1 is shown. A plurality of grooves oriented at a non-axial direction are disposed around the external surface 12-2 of the tool body section 12-1, with the grooves being defined by regions of reduced radial dimensions and alternating land members. The sides of each groove 342 appears having a flat surface in FIG. 3E, however, one of skill in the art would appreciate that depending on the details of the groove construction, either side of the groove may be represented by a curved surface. An antenna pathway 347 (outlined by the two dashed lines in FIG. 3E) is formed by machining out a portion of each land 344. An axial antenna coil 340B is positioned in the antenna pathway 347, passing through the alternating grooves and lands. FIG. 3E illustrates clearly that the grooves orientation, being at a non-axial direction with respect to the longitudinal axis of the tool body section 12-1, is clearly distinguished from a groove orientation running parallel with respect to the longitudinal axis 341 of the tool body section 12-1.

In an embodiment, for example, not having axial grooves, but two sets of non-axial grooves, a land segment between the sets of non-axial grooves is present, which has different dimension than the lands that are between adjacent grooves in the same set. This is illustrated by the embodiment of FIG. 3E on a single tool body section 12-1.

Figure 3G:
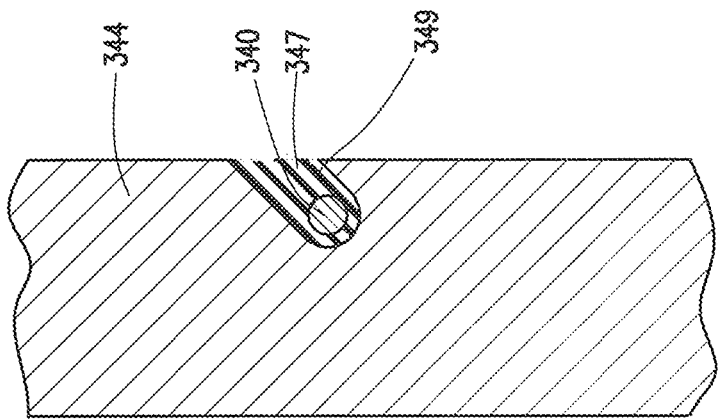
FIG. 3F-3G show sectional views along the orientation of a groove and through a land, respectively.
Figure 3F:
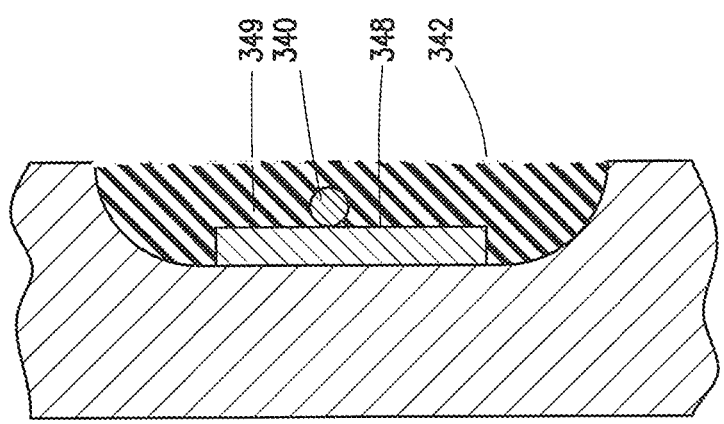

FIG. 3F is a sectional view through a single groove 342 with coil 340 passing therethrough, along the orientation of the groove 342. A non-metallic protective material 349, such as fiber glass or epoxy, is disposed in each groove filling the remaining space of the groove to a level substantially flush with the external surface of the neighboring lands. The coil 340 appears having a circular shape in FIG. 3F, however, one of skill in the art would appreciate that depending on the orientation of a particular groove 342 and/or the shape of wire of the coil 340 itself, the coil 340 may also be represented by an elliptical shape. Furthermore, the coil 340 appears having one turn of conductor wire in FIG. 3F, however, one of skill in the art would appreciate that the coil 340 may be formed of more than one turns of conductor wire.

As shown in the embodiment of FIG. 3F, a magnetic permeable material insert 348 may be disposed in each groove such that the insert 348 is under the coil 340 when the coil 340 is placed about the tool body section 12-1. The magnetic permeable material may, for example, be a ferrite material.

FIG. 3G is a sectional view through a land 344 along the orientation of a neighboring groove 342. The antenna passes through an antenna pathway 347, which is formed by machining a portion out of the land 344. In FIG. 3G, the sectional view of the antenna pathway 347 in the land 344 appears sloped at an angle, however, one of skill in the art would appreciate that other embodiments with an antenna pathway formed in different orientations and shapes are possible. A non-metallic protective material 349, such as fiber glass or epoxy, is disposed in any remaining space of the antenna pathway to a level substantially flush with the external surface of the land. The coil 340 appears having a circular shape in FIG. 3G, however, one of skill in the art would appreciate that depending on the orientation of the section of a particular land 344 and/or the shape of wire of the coil 340 itself, the coil 340 may also be represented by an elliptical shape. Furthermore, the antenna pathway 347, as shown in the figure, is illustrated as formed by machining a single portion out of the land with the coil 340 having one turn of conductor wire disposed in it in FIG. 3G. However, one of skill in the art will appreciate that the antenna pathway may be formed by machining multiple portions out of the land, with adjacent portions axially spaced apart from one another, and with one or more turns of conductor wire disposed in each of the multiple portions of the antenna pathway.

Methods

Turning now to a discussion of methods carried out using the hardware described above, FIG. 4 shows a flow chart of a method for acquiring data using an antenna assembly in accordance with the present disclosure.

A method of acquiring data in a borehole formed in a formation includes disposing 460 a tool comprising at least one transmitter and at least one receiver in a borehole. At least one of the transmitter(s) or receiver(s) will be one of the antenna assembly embodiments disclosed herein and described with reference to FIG. 3A-3G, having at least one of the plurality of grooves in the tool body section being oriented at a non-axial direction with respect to the longitudinal axis of the tool body section. The method can include spacing the transmitter axially apart from the receiver, as described with respect to FIG. 2. The method can include azimuthally rotating the tool in the borehole, and for example, while drilling.

The method can include selectively 462 transmitting electromagnetic energy from the transmitter. The method can include obtaining 464 a plurality of data pairs associated with the transmitted energy at the receiver (which, upon processing, can generate a directional measurement). The method can optionally include using the directional measurement to alter (or alternatively, confirm) a drilling plan. The method can optionally include using the directional measurement to determine a direction to a formation boundary, a distance to the formation boundary, and/or relative resistivity on opposing sides of the formation boundary.

Turning now to a data processing method, a directional downhole tool (such as that shown in FIG. 2) comprises at least two antennas, one being a non-directional antenna and the other being a directional antenna such as those disclosed in the present disclosure. One antenna is used as a transmitter transmitting electromagnetic field at, e.g., 100 kHz, and or 400 kHz and or 2 MHz, and the other antenna is used as a receiver. The induced signal function V(φ) at the receiver can be written according to an equation of the form:

$$V(\varphi) = V_0 + V_{1c} * \cos \varphi + V_{1s} * \sin \varphi \qquad \text{Eq. (1)}$$

where $\varphi$ is the toolface angle. In the real situation, it is a discrete function approximated by a plurality of data pairs, each pair comprising a induced signal at each discrete time, and a corresponding toolface angle measured, for example, by a magnetometer, an accelerometer, or like device at the same time as the induced signal is measured. It is expected that within a short time interval $V_0$, $V_{1c}$, and $V_{1s}$, which are termed $0^{th}$ and $1^{st}$ harmonic coefficients, that are in general linear combinations of various components of the induced magnetic fields, which are tensors, and contain information of the formation around the borehole, will remain relatively constant. During this time interval there can be a plurality of the induced signals and toolface angles measured. The present method is directed toward calculating coefficients $V_0$, $V_{1c}$, and $V_{1s}$ from the plurality of the data pairs, each pair comprising an induced signal, and a corresponding toolface angle.

The coefficients can be calculated based on the following mathematical equations:

$$V_0 = \frac{\int_0^{2\pi} V(\varphi) * d\varphi}{2\pi} \quad \text{Eq. (2a)}$$

$$V_{1c} = \frac{\int_0^{\frac{\pi}{2}} V(\varphi)*d\varphi + \int_{\frac{3\pi}{2}}^{2\pi} V(\varphi)*d\varphi - \int_{\frac{\pi}{2}}^{\frac{3\pi}{2}} V(\varphi)*d\varphi}{4} \quad \text{Eq. (2b)}$$

$$V_{1s} = \frac{\int_0^{\pi} V(\varphi)*d\varphi - \int_{\pi}^{2\pi} V(\varphi)*d\varphi}{4} \quad \text{Eq. (2c)}$$

Equations 2a, 2b, and 2d indicate that the area defined by the induced signal function across the total toolface range can be divided into a number of sub-sets (such as, for example, four sub-sets) according to toolface values, such as, for example: $[0, \pi/2]$, $[\pi/2, \pi]$, $[\pi, 3\pi/2]$, and $[3\pi/2, 2\pi]$. The signed areas of these sub-sets are referred to herein as Area1, Area2, Area3, and Area4. Coefficients $V_0$, $V_{1c}$, and $V_{1s}$ can then be obtained by calculating (such as, for example, by discrete integration) the areas of the sub-sets as follows:

$$V\_0 = \frac{\text{Area 1} + \text{Area 2} + \text{Area 3} + \text{Area 4}}{2\pi} \quad \text{Eq. (3a)}$$

$$V\_1c = \frac{\text{Area 1} - \text{Area 2} - \text{Area 3} + \text{Area 4}}{4} \quad \text{Eq. (3b)}$$

$$V\_1s = \frac{\text{Area 1} + \text{Area} - \text{Area 3} - \text{Area 4}}{4} \quad \text{Eq. (3c)}$$

Figure 5:
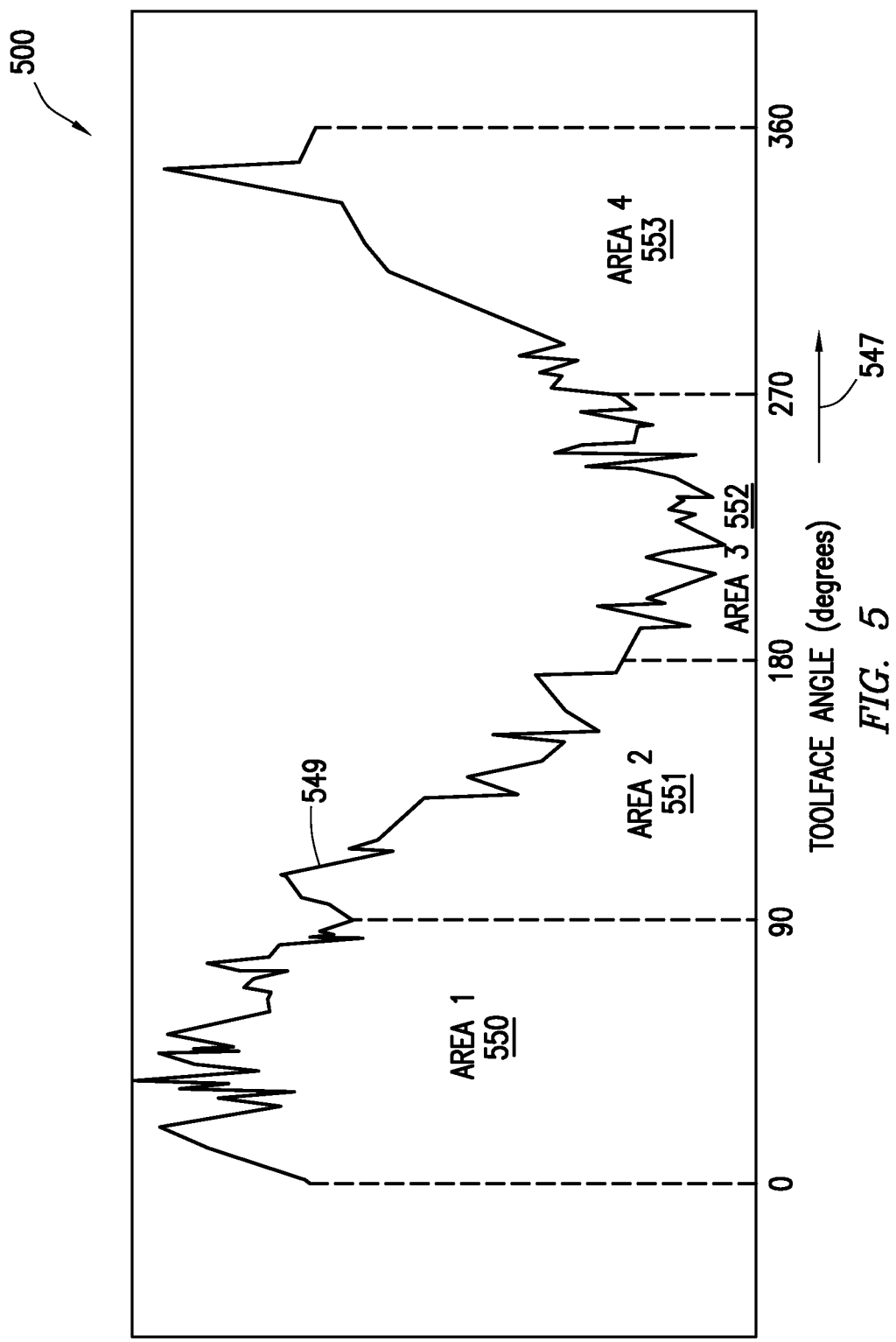
FIG. 5 shows a plot of an induced signal function approximated by connecting discrete signal data points, as well as the four sub-sets of the area of the induced signal function, in accordance with an embodiment of the present invention.

FIG. 5 shows a plot 500 of an induced signal function approximated by a signal curve 549 by connecting discrete signal data points 548. The signal data points are original simulated with a random noise added to the exact induced signal function plotted as a curve 656 in FIG. 6. As many as four signal data points (at 0, $\pi/2$, $\pi$, $3\pi/2$, and $2\pi$) may be added, if not already presented in the original simulated data points, via interpolations. The area of the signal curve 549 can be divided based upon toolface angle into a number of sub-sets (in the example, four sub-sets 550, 551, 552, and 553 representing four sub-sets of toolface angles). The signed area, which will be simply referred to as "area" for short hereafter, for each sub-set can be calculated using an integration method, such as the trapezoidal method, to obtain the coefficients according to the mathematical equations above. With the coefficient values, one can combine the $0^{th}$ harmonic coefficient and the $1^{st}$ harmonic coefficients linearly to generate measurements used, for example, for well placement, or geosteering, and formation evaluation applications. Though four sub-sets of the induced signal function are shown in FIG. 5, it is also contemplated that fewer sub-sets or greater sub-sets could render a coefficient result useful for similar purposes.

Figure 6:
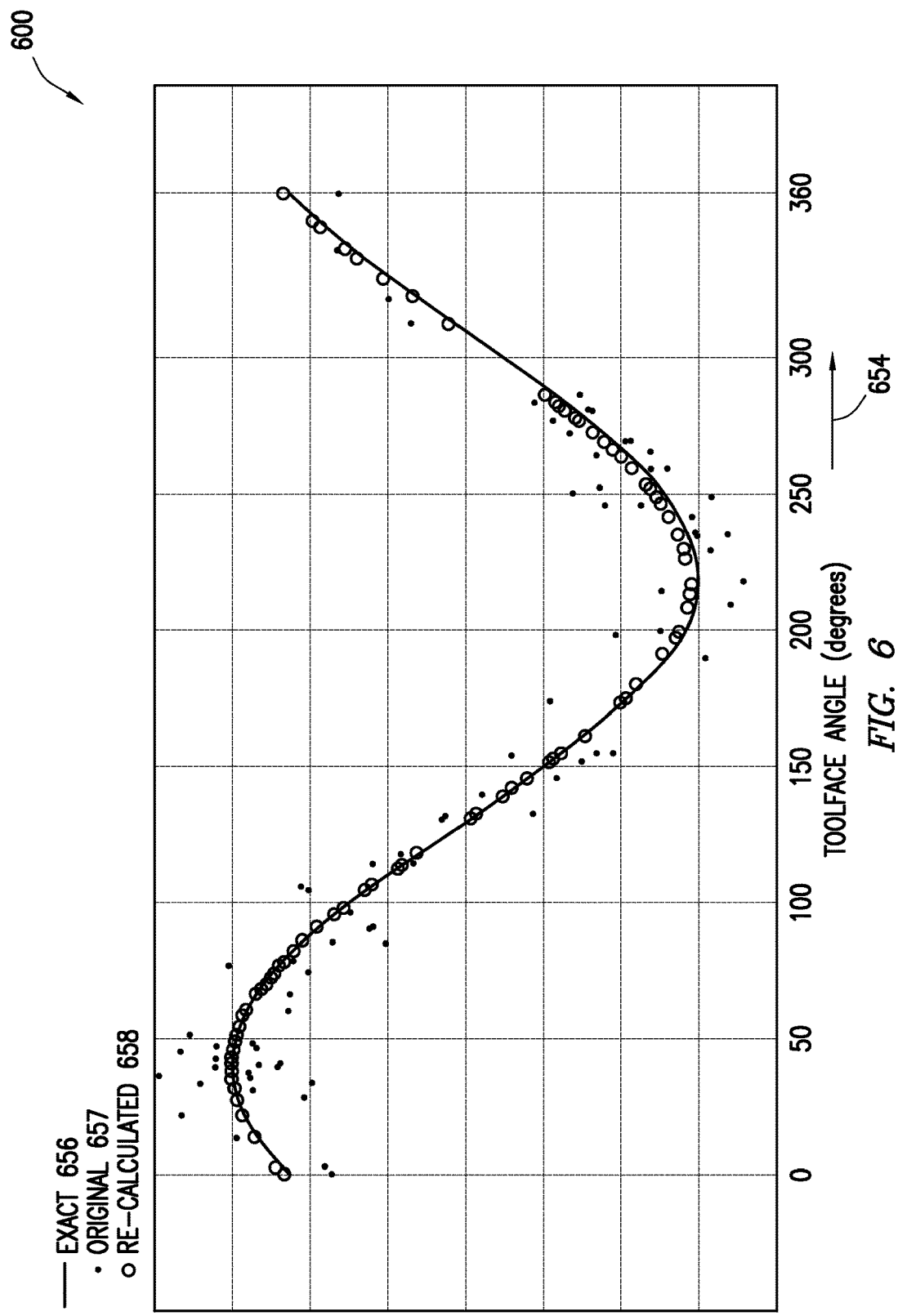
FIG. 6 shows a plot of original simulated data points, re-calculated data points in accordance with an embodiment of the present invention, and the exact signal of a sinusoidal form.

FIG. 6 shows a plot 600 with original simulated signal data points, re-calculated signal data points in accordance with an embodiment of the present invention, and the exact signal which is a sinusoidal curve, shown for comparison. The re-calculated data points 658 are generated from Eq. (1) by using the calculated $V_0$, $V_{1c}$, and $V_{1s}$ from Eq. (3). As seen in the plot, the re-calculated data points are a more accurate representation of the exact signal than the original simulated data points. This demonstrates that the calculated $V_0$, $V_{1c}$, and $V_{1s}$ from Eq. (3) can provide an accurate representation of the exact signal.

If both transmitter and receiver are directional antennas such as those disclosed in the present invention above, Eq. (1) will need to be extended to add two second harmonic terms $V_{2c}*\cos(2\varphi)+V_{2s}*\sin(2\varphi)$, with $V_{2c}$ and $V_{2s}$ being termed $2^{nd}$ harmonic coefficients, which are in general linear combinations various components of the induced magnetic fields and contain information of the formation around the borehole. The method described above can be generalized to calculate the second harmonics coefficients. The area of the induced signal function is divided into 8 sub-sets according to the toolface angle: $[0, \pi/4]$, $[\pi/4, \pi/2]$, $[\pi/2, 3\pi/4]$, $[3\pi/4, \pi]$, $[\pi, 5\pi/4]$, $[5\pi/4, 3\pi/2]$, $[3\pi/2, 7\pi/4]$, and $[7\pi/4, 2\pi]$, and the area of each sub-set is referred to as Area1_1, Area1_2, Area2_1, Area2_2, Area3_1, Area3_2, Area4_1 and Area4_2. Then, accordingly, $V_{2c}$ and $V_{2s}$ can be calculated from the 8 areas of the sub-sets as follow:

$$V_{2c} = \frac{(Area1\_1 - Area1\_2 - Area2\_1 + Area2\_2 + Area3\_1 - Area3\_2 - Area4\_1 + Area4\_2)}{4} \quad \text{Eq. (4a)}$$

$$V_{2s} = \frac{(Area1\_1 + Area1\_2 - Area2\_1 - Area2\_2 + Area3\_1 + Area3\_2 - Area4\_1 - Area4\_2)}{4} \quad \text{Eq. (4b)}$$

As above, one can combine the $0^{th}$ harmonic coefficient, $1^{st}$ harmonic coefficients, and the $2^{nd}$ harmonic coefficients linearly to generate measurements, for example, for well placement and formation evaluation applications.

FIG. 7 shows a flow chart of a method 700 for processing data obtained in accordance with the present disclosure to produce measurements. The method for processing data can include disposing 770 a downhole tool in a borehole. In an embodiment, the downhole tool includes at least one transmitter and at least one receiver in a borehole disposed in a formation. At least one of the transmitter(s) and receiver(s) is a directional antenna. In an embodiment, at least one of the transmitter(s) and receiver(s) is an antenna assembly according to the present disclosure. The method continues with rotating 772 the downhole tool in the borehole through a plurality of toolface values.

The method can include acquiring 774 in the borehole a plurality of data pairs to approximate an induced signal function. In an embodiment, each data pair includes an induced signal at the at least one receiver and a corresponding toolface angle from among the total toolface range. One or more data pairs may be added via interpolation using some of the acquired data pairs so that the toolface angles span the total toolface range. The method can include calculating 776 at least one area of the induced signal function to generate a measurement characterizing the formation.

The method can include dividing the total toolface range into a plurality of sub-sets, and calculating, for each sub-set of the total toolface range, the area of the induced signal function to generate a measurement characterizing the formation.

In an embodiment, the plurality of sub-sets is four sub-sets. In an embodiment, the plurality of sub-sets is eight sub-sets. In an embodiment, the plurality of sub-sets span equal ranges of toolface angles.

The measurement includes a linear combination of the areas of the plurality of sub-sets of the induced signal function.

The measurement includes a magnitude ratio or a phase difference between two different linear combinations of the areas of the plurality of sub-sets of the induced signal function.

The measurement includes a $0^{th}$ harmonic coefficient of the induced signal, one or more $1^{st}$ harmonic coefficients of the induced signal, and one or more $2^{nd}$ harmonic coefficients of the induced signal.

In an embodiment, the calculating comprises a trapezoidal integration method.

In an embodiment, the method can include linearly combining a $0^{th}$ harmonic coefficient, one or more $1^{st}$ harmonic coefficients and, if determined, one or more $2^{nd}$ harmonic coefficients.

In an embodiment, the method can include a magnitude ratio or a phase difference between two different linear combinations of the $0^{th}$ harmonic coefficient, the $1^{st}$ harmonic coefficient and, if determined, the $2^{nd}$ harmonic coefficients.

The method can optionally include using the measurement characterizing the formation, for example, for geosteering and formation evaluation.

In an embodiment, the directional transmitter is selected from any of the antenna assembly designs described above with respect to FIG. 3A-3G. In an embodiment, the directional receiver is selected from any of the antenna assembly designs described above with respect to FIG. 3A-3G. In still another embodiment, both the transmitter and the receiver are selected from any of the antenna assembly designs described above with respect to FIG. 3A-3G.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. An antenna assembly, comprising:
   a tool body section having a longitudinal axis, an external surface, and an internal surface;
   a plurality of closed-ended grooves spaced around, embedded in, and bounded entirely, except at a top of the respective closed-ended groove, by the tool body section;
   wherein each of the closed-ended grooves is characterized by a length defined by a distance between a first end surface in the tool body section and a second end surface in the tool body section, a depth orthogonal to the length and extending from the external surface to a bottom surface in the tool body section, the bottom surface extending from the first end surface to the second end surface, and a width less than the length, orthogonal to the length and the depth, and defined by a distance between a first sidewall surface in the tool body section and a second sidewall surface in the tool body section, the bottom surface being located at some radially inward depth relative to the external surface but at some radially outward depth relative to the internal surface, the first sidewall surface, the second sidewall surface, the first end surface, and the second end surface each, respectively, extending from the bottom surface to the external surface, the bottom surface being contiguous, respectively, with the first sidewall surface, the second sidewall surface, the first end surface, and the second end surface, and the first sidewall surface and the second sidewall surface each, respectively, being contiguous with the first end surface and the second end surface;
   wherein a first groove of the plurality of closed-ended grooves is oriented at a first non-axial direction and a second groove of the plurality of closed-ended grooves is oriented at a second direction, the first direction and the second direction being different;
   wherein the first groove, in combination with a particular axial or tilted coil selected from a set of one or more coils, produces a first magnetic dipole moment, and the second groove, in combination with the same particular axial or tilted coil, simultaneously produces a second magnetic dipole moment, a direction of the first magnetic dipole moment and a direction of the second magnetic dipole moment being different;
   wherein, for each groove in the plurality of closed-ended grooves, the external surface spans the width between the first sidewall surface and the second sidewall surface, extending between and from an end of the first sidewall surface to a corresponding end of the second sidewall surface; and
   wherein a line extending in a direction in which the first groove is elongated and disposed between the first sidewall surface of the first groove and the second sidewall surface of the first groove and passing through the particular axial or tilted coil intersects the first end surface of the first groove, the second end surface of the first groove, and the external surface.

2. The antenna assembly of claim 1, wherein at least one groove of the plurality of closed-ended grooves is oriented transversely or axially with respect to the longitudinal axis of the tool body section.

3. The antenna assembly of claim 1, further comprising:
   a plurality of lands spaced around the tool body section, each land of the plurality of lands separating at least two adjacent grooves of the plurality of closed-ended grooves; and an antenna pathway traversing the plurality of closed-ended grooves and the plurality of lands around the tool body section, wherein the particular coil is disposed in the antenna pathway.

4. The antenna assembly of claim 3, wherein the antenna pathway is formed by machining out at least one portion of each land.

5. The antenna assembly of claim 4, further comprising, for each of one or more particular lands of the plurality of lands, a cover joined to the tool body section, disposed substantially over the machined-out portion of that particular land, and being substantially flush with the external surface of the tool body section.

6. The antenna assembly of claim 4, wherein, for each of one or more particular lands of the plurality of lands, the machined-out portion of that particular land is cut at some non-radial angle.

7. The antenna assembly of claim 3, wherein the antenna pathway intersects a non-axial groove of the plurality of closed-ended grooves at a non-orthogonal angle.

8. The antenna assembly of claim 3, wherein at least one land of the plurality of lands has one or more dimensions different from the dimensions of at least one other land of the plurality of lands.

9. A downhole measurement tool for obtaining data in a borehole, comprising:
one or more transmitters; and
one or more receivers;
wherein at least one of the transmitters or at least one of the receivers comprises:
a tool body section having a longitudinal axis, an external surface, and an internal surface;
a plurality of closed-ended grooves spaced around, embedded in, and bounded entirely, except at a top of the respective closed-ended groove, by the tool body section;
wherein each of the closed-ended grooves is characterized by a length defined by a distance between a first end surface in the tool body section and a second end surface in the tool body section, a depth orthogonal to the length and extending from the external surface to a bottom surface in the tool body section, the bottom surface extending from the first end surface to the second end surface, and a width less than the length, orthogonal to the length and the depth, and defined by a distance between a first sidewall surface in the tool body section and a second sidewall surface in the tool body section, the bottom surface being located at some radially inward depth relative to the external surface but at some radially outward depth relative to the internal surface, the first sidewall surface, the second sidewall surface, the first end surface, and the second end surface each, respectively, extending from the bottom surface to the external surface, the bottom surface being contiguous, respectively, with the first sidewall surface, the second sidewall surface, the first end surface, and the second end surface, and the first sidewall surface and the second sidewall surface each, respectively, being contiguous with the first end surface and the second end surface;
wherein a first groove of the plurality of closed-ended grooves is oriented at a first non-axial direction and a second groove of the plurality of closed-ended grooves is oriented at a second direction, the first direction and the second direction being different;
wherein the first groove, in combination with a particular axial or tilted coil selected from a set of one or more coils, produces a first magnetic dipole moment, and the second groove, in combination with the same particular axial or tilted coil, simultaneously produces a second magnetic dipole moment, a direction of the first magnetic dipole moment and a direction of the second magnetic dipole moment being different;
wherein, for each groove in the plurality of closed-ended grooves, the external surface spans the width between the first sidewall surface and the second sidewall surface, extending between and from an end of the first sidewall surface to a corresponding end of the second sidewall surface; and
wherein a line extending in a direction in which the first groove is elongated and disposed between the first sidewall surface of the first groove and the second sidewall surface of the first groove and passing through the particular axial or tilted coil intersects the first end surface of the first groove, the second end surface of the first groove, and the external surface.

10. The downhole measurement tool of claim 9, wherein at least one groove of the plurality of closed-ended grooves is oriented transversely or axially with respect to the longitudinal axis of the tool body section.

11. The downhole measurement tool of claim 9, further comprising:
a plurality of lands spaced around the tool body section, each land of the plurality of lands separating at least two adjacent grooves of the plurality of closed-ended grooves; and
an antenna pathway traversing the plurality of closed-ended grooves and the plurality of lands around the tool body section, wherein the particular coil is disposed in the antenna pathway.

12. The downhole measurement tool of claim 11, wherein the antenna pathway is formed by machining out at least one portion of each land.

13. The downhole measurement tool of claim 12, further comprising, for each of one or more particular lands of the plurality of lands, a cover joined to the tool body section, disposed substantially over the machined-out portion of that particular land, and being substantially flush with the external surface of the tool body section.

14. The downhole measurement tool of claim 12, wherein, for each of one or more particular lands of the plurality of lands, the machined-out portion of that particular land is cut at some non-radial angle.

15. The downhole measurement tool of claim 11, wherein the antenna pathway intersects a non-axial groove of the plurality of closed-ended grooves at a non-orthogonal angle.

16. The downhole measurement tool of claim 11, wherein at least one land of the plurality of lands has one or more dimensions different from the dimensions of at least one other land of the plurality of lands.

17. The downhole measurement tool of claim 9, wherein at least one transmitter of the one or more transmitters and at least one receiver of the one or more receivers are deployed on a single tool module.

18. The downhole measurement tool of claim 9, wherein at least one transmitter of the one or more transmitters and at least one receiver of the one or more receivers are deployed on different tool modules.

19. A method to obtain a measurement in a borehole formed in a formation, comprising:
disposing a tool comprising one or more transmitters and one or more receivers in a borehole, at least one of the transmitters or at least one of the receivers having an antenna assembly comprising:

a tool body section having a longitudinal axis, an external surface, and an internal surface;

a plurality of closed-ended grooves spaced around, embedded in, and bounded entirely, except at a top of the respective closed-ended groove, by the tool body section;

wherein each of the closed-ended grooves is characterized by a length defined by a distance between a first end surface in the tool body section and a second end surface in the tool body section, a depth orthogonal to the length and extending from the external surface to a bottom surface in the tool body section, the bottom surface extending from the first end surface to the second end surface, and a width less than the length, orthogonal to the length and the depth, and defined by a distance between a first sidewall surface in the tool body section and a second sidewall surface in the tool body section, the bottom surface being located at some radially inward depth relative to the external surface but at some radially outward depth relative to the internal surface, the first sidewall surface, the second sidewall surface, the first end surface, and the second end surface each, respectively, extending from the bottom surface to the external surface, the bottom surface being contiguous, respectively, with the first sidewall surface, the second sidewall surface, the first end surface, and the second end surface, and the first sidewall surface and the second sidewall surface each, respectively, being contiguous with the first end surface and the second end surface;

wherein a first groove of the plurality of closed-ended grooves is oriented at a first non-axial direction and a second groove of the plurality of closed-ended grooves is oriented at a second direction, the first direction and the second direction being different;

wherein the first groove, in combination with a particular axial or tilted coil selected from a set of one or more coils, produces a first magnetic dipole moment, and the second groove, in combination with the same particular axial or tilted coil, simultaneously produces a second magnetic dipole moment, a direction of the first magnetic dipole moment and a direction of the second magnetic dipole moment being different;

wherein, for each groove in the plurality of closed-ended grooves, the external surface spans the width between the first sidewall surface and the second sidewall surface, extending between and from an end of the first sidewall surface to a corresponding end of the second sidewall surface;

wherein a line extending in a direction in which the first groove is elongated and disposed between the first sidewall surface of the first groove and the second sidewall surface of the first groove and passing through the particular axial or tilted coil intersects the first end surface of the first groove, the second end surface of the first groove, and the external surface;

selectively transmitting electromagnetic energy from at least one of the transmitters; and acquiring a plurality of data pairs associated with the transmitted energy using at least one of the receivers;

wherein the data acquisition uses at least one transmitter of the one or more transmitters having the antenna assembly or at least one receiver of the one or more receivers having the antenna assembly.

20. The method of claim 19, wherein at least one groove of the plurality of closed-ended grooves of the antenna assembly is oriented transversely or axially with respect to the longitudinal axis of the tool body section.

21. The method of claim 19, wherein the antenna assembly further comprises:
a plurality of lands spaced around the tool body section, each land of the plurality of lands separating at least two adjacent grooves of the plurality of closed-ended grooves; and
an antenna pathway traversing the plurality of closed-ended grooves and the plurality of lands around the tool body section, wherein the particular coil is disposed in the antenna pathway.

22. The method of claim 21, wherein the antenna assembly further comprises, for each of one or more particular lands of the plurality of lands, a cover disposed substantially within the antenna pathway traversing that particular land and substantially flush with the external surface of the tool body section.

23. The method of claim 21, wherein, for each of one or more particular lands of the plurality of lands, the antenna pathway is disposed therein at some non-radial angle.

24. The method of claim 21, wherein the antenna pathway intersects a non-axial groove of the plurality of closed-ended grooves at a non-orthogonal angle.

25. The method of claim 21, wherein at least one land of the plurality of lands has one or more dimensions different from the dimensions of at least one other land of the plurality of lands.

26. The method of claim 19, further comprising generating a measurement indicative of at least one of a direction to a formation boundary, a distance to the formation boundary, and one or more resistivities of the formation using the acquired data pairs.

27. The method of claim 26, further comprising altering or confirming a drilling plan using the generated measurement.

28. The method of claim 19, further comprising deploying at least one transmitter of the one or more transmitters and at least one receiver of the one or more receivers on a single tool module.

29. The method of claim 19, further comprising deploying at least one transmitter of the one or more transmitters and at least one receiver of the one or more receivers on different tool modules.

30. An antenna assembly, comprising:
a tool body having a longitudinal axis, an internal surface, an external surface, and a structural material between the internal surface and the external surface;
a plurality of grooves embedded in a radially outward, relative to the longitudinal axis, region of the structural material; each groove in the plurality of grooves being bounded by a first sidewall surface formed by a first portion of the structural material, the first sidewall surface having a closed first sidewall boundary, a second sidewall surface formed by a second portion of the structural material, the second sidewall surface having a closed second sidewall boundary, and a bottom surface formed by a third portion of the structural material, the bottom surface having a closed bottom boundary; the bottom surface extending from every portion of the first sidewall boundary not on the external surface of the tool body to every portion of the second sidewall boundary not on the external surface of the tool body to form an enclosure that is open only at a top of the groove; each groove in the plurality of grooves extending continuously from the respective top of the groove, located substantially flush with the external surface of the tool body, radially inward to the respective bottom surface of the groove located at some depth radially outward from the internal surface of the tool body;

wherein, for each groove in the plurality of grooves, one or more portions of the external surface span the space between some portion of the first sidewall boundary and some portion of the second sidewall boundary, the one or more portions of the external surface extending between and from the first sidewall surface to the second sidewall surface;

a first groove in the plurality of grooves having a first orientation in a direction in which the first groove is elongated;

a second groove in the plurality of grooves having a second orientation in a direction in which the second groove is elongated, wherein the first orientation direction is different from the second orientation direction;

a plurality of lands formed by the structural material between adjacent grooves of the plurality of grooves;

an antenna pathway traversing the plurality of grooves and the plurality of lands; and an axial or tilted antenna coil disposed in the antenna pathway;

wherein the axial or tilted antenna coil, when energized, gives rise to a first magnetic dipole moment directed along the first orientation direction and a second magnetic dipole moment directed along the second orientation direction, wherein the antenna pathway is formed by machining out at least one portion of each land of the plurality of lands; and wherein, for each of one or more particular lands of the plurality of lands, the machined-out portion of that particular land is cut at some non-radial angle.

31. An antenna assembly, comprising: a tool body having a longitudinal axis, an internal surface, an external surface, and a structural material between the internal surface and the external surface; a plurality of grooves embedded in a radially outward, relative to the longitudinal axis, region of the structural material; each groove in the plurality of grooves being bounded by a first sidewall surface formed by a first portion of the structural material, the first sidewall surface having a closed first sidewall boundary, a second sidewall surface formed by a second portion of the structural material, the second sidewall surface having a closed second sidewall boundary, and a bottom surface formed by a third portion of the structural material, the bottom surface having a closed bottom boundary; the bottom surface extending from every portion of the first sidewall boundary not on the external surface of the tool body to every portion of the second sidewall boundary not on the external surface of the tool body to form an enclosure that is open only at a top of the groove; each groove in the plurality of grooves extending continuously from the respective top of the groove, located substantially flush with the external surface of the tool body, radially inward to the respective bottom surface of the groove located at some depth radially outward from the internal surface of the tool body; wherein, for each groove in the plurality of grooves, one or more portions of the external surface span the space between some portion of the first sidewall boundary and some portion of the second sidewall boundary, the one or more portions of the external surface extending between and from the first sidewall surface to the second sidewall surface; a first groove in the plurality of grooves having a first orientation in a direction in which the first groove is elongated; a second groove in the plurality of grooves having a second orientation in a direction in which the second groove is elongated, wherein the first orientation direction is different from the second orientation direction; a plurality of lands formed by the structural material between adjacent grooves of the plurality of grooves; an antenna pathway traversing the plurality of grooves and the plurality of lands; and an axial or tilted antenna coil disposed in the antenna pathway; wherein the axial or tilted antenna coil, when energized, gives rise to a first magnetic dipole moment directed along the first orientation direction and a second magnetic dipole moment directed along the second orientation direction, wherein, for each of one or more particular lands of the plurality of lands, the antenna pathway is disposed therein at some non-radial angle.

* * * * *